United States Patent [19]

Carlberg

[11] 4,280,025
[45] Jul. 21, 1981

[54] LOCKABLE COVER ASSEMBLY FOR PUSH-BUTTON KEY PAD

[75] Inventor: David Carlberg, Los Altos, Calif.

[73] Assignee: Engineering Systems Corp., Santa Clara, Calif.

[21] Appl. No.: 110,660

[22] Filed: Jan. 9, 1980

[51] Int. Cl.³ .............................................. H04M 1/66
[52] U.S. Cl. ............................ 179/189 D; 179/90 D; 70/DIG. 72
[58] Field of Search ............ 179/189 D, 189 R, 90 D; 70/DIG. 72, 163, 164, 167, 171

[56] References Cited

U.S. PATENT DOCUMENTS

| | | | |
|---|---|---|---|
| 3,495,050 | 2/1970 | Bart | 179/189 R |
| 3,866,000 | 2/1975 | Gillis | 179/189 D |
| 4,005,279 | 1/1977 | Richter | 179/189 D |
| 4,023,386 | 5/1977 | Walters | 70/164 |
| 4,081,630 | 3/1978 | Washburn et al. | 179/189 R |
| 4,204,097 | 5/1980 | Schmit | 179/189 D |

*Primary Examiner*—Gerald L. Brigance
*Attorney, Agent, or Firm*—Harris Zimmerman; Howard Cohen

[57] ABSTRACT

A lockable cover assembly for a push-button key pad, such as for telephones or the like, includes a face plate having apertures through which the push-buttons extend outwardly. The face plate also includes a plurality of slots along one edge thereof, and a lock access hole disposed adjacent to the opposing edge. A key pad cover includes a plurality of locking lugs along one edge which engage the slots of the key pad cover, and a lock disposed at the opposing edge of the cover. The lock includes a shaft which extends through the access hole of the cover to engage an inner portion of the housing of the unit being protected.

7 Claims, 4 Drawing Figures

U.S. Patent    Jul. 21, 1981    4,280,025
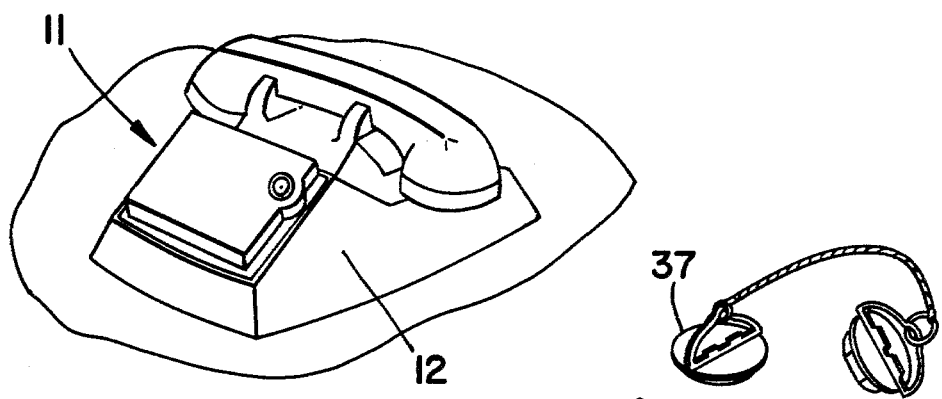
FIG_1
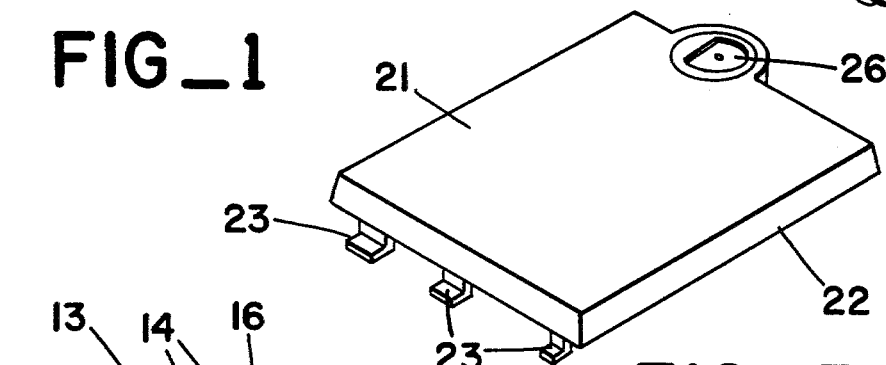
FIG_3
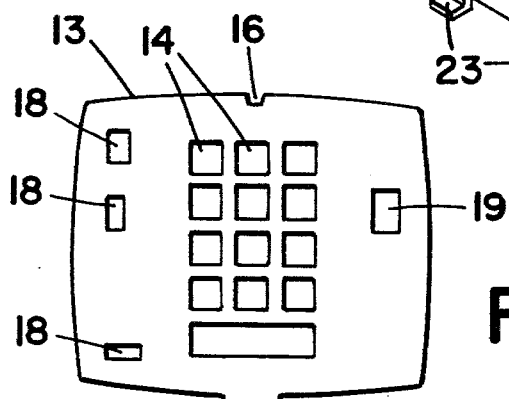
FIG_2
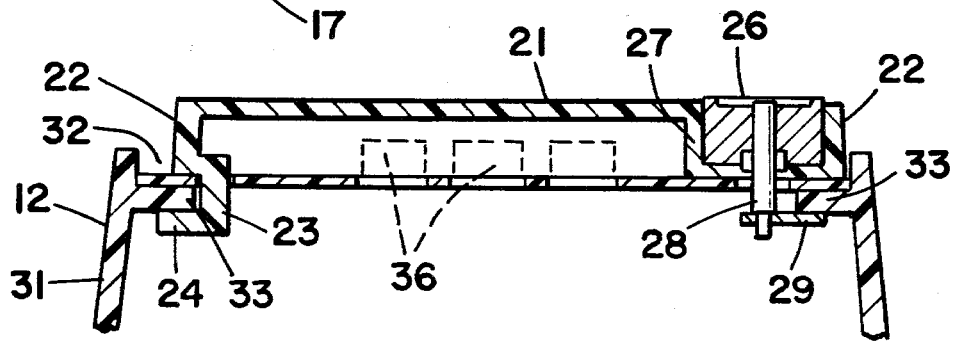
FIG_4

LOCKABLE COVER ASSEMBLY FOR PUSH-BUTTON KEY PAD

BACKGROUND OF THE INVENTION

Unauthorized use of a telephone instrument can result in a substantial loss to a telephone subscriber. Such loss is compounded by the fact that unauthorized calls are difficult to detect if made surreptitiously, and may not become apparent until they are billed to the telephone subscriber.

There are known in the prior art many devices for preventing unauthorized use of a telephone instrument, particularly for dial-type telephones. The simplist device for dial-type telephones comprises a lock which secures to the dial, preventing rotation of the dial yet permitting the use of the telephone instrument for receiving incoming calls.

The advent of push button type telephones has made the task of preventing unauthorized calls more difficult, although there are devices in the prior art which are designed for such use. The following United States patents comprise the closest known prior art:

U.S. Pat. No. 3,866,000
3,899,647
3,965,410
4,005,279
4,081,630

Most of these patents disclose a security device which circumscribes a portion of the telephone instrument, and in particular includes a cover which prevents manual access to the push-button key pad of the telephone. However, the portions of these devices which surround the telephone make the instrument itself heavy and unwieldy. Furthermore, when the cover is opened to permit access to the key pad, the cover and its associated structure requires a great amount of space adjacent to the telephone itself. For these reasons, these prior art locking devices for push-button telephones have not gained wide acceptance. Other devices provide a cover which locks directly to the face plate of the key pad portion of a telephone. However, the face plate does not have the mechanical strength to resist tampering, so that the cover easily may be pried open to gain access to the key pad.

SUMMARY OF THE PRESENT INVENTION

The present invention generally comprises a lockable cover assembly secured to a telephone instrument to prevent unauthorized use of the telephone. The invention provides a tamperproof cover which locks directly to the housing of the instrument, so that it resists tampering and cannot easily be pried loose.

The invention includes a face plate for the key pad portion of the telephone instrument, the face plate including apertures through which the key pad buttons extend outwardly. The face plate rests on an internal flange of the telephone housing, the flange supporting the face plate typically supplied with telephone instruments known in the prior art. The face plate of the present invention includes a plurality of slots disposed adjacent to one side of the face plate, and a lock access hole disposed adjacent to the opposing side of the face plate.

The invention also includes a lockable cover which is dimensioned to extend over the key pad portion of the telephone to prevent manual access thereto. The cover includes a plurality of locking lugs disposed at one edge of the cover and extending therefrom. The lugs are adapted to extend through the slots of the face plate and to engage the underside of the flange which supports the face plate. At the side opposite the locking lugs, the cover includes a magnetic lock having a shaft which extends downwardly through the lock access hole of the face plate. The distal end of the lock shaft includes a latch extending perpendicularly therefrom to engage the underside of the flange which supports the face plate.

The cover is removable by rotating the magnetic lock to free the latch from its engagement with the underside of the flange of the telephone housing. When the latch is free, the cover may be pivotted upwardly about the locking lugs, and the locking lugs may then be withdrawn from the slots in the face plate to remove entirely the cover from the telephone instrument. The cover may be reinstalled by reversing this procedure.

It should be noted that the cover is secured not to the face plate of the assembly, but rather to the flange of the telephone housing which supports the face plate. The cover is comparable in strength to the strength of the housing of the telephone, so that tampering with the cover is as likely to destroy the telephone instrument as it is to free the cover to gain access to the key pad.

A BRIEF DESCRIPTION OF THE DRAWING

FIG. 1 is a perspective view of the telephone locking device of the present invention, shown installed on a telephone instrument.

FIG. 2 is a plan view of the face plate of the present invention.

FIG. 3 is a perspective view of the lockable cover of the present invention.

FIG. 4 is a cross-sectional elevation of the locking device of the present invention, shown installed on a telephone instrument.

DESCRIPTION OF THE PREFERRED EMBODIMENT

The present invention generally comprises a lockable cover assembly used in conjunction with a telephone instrument to prevent unauthorized access to the key pad portion of the telephone. The present invention thus prevents the use of the telephone instrument for unauthorized or surreptitious out-going telephone calls.

As shown in FIG. 1, the lockable cover assembly 11 is secured to a telephone instrument 12 directly over the key pad portion of the instrument. There is no bracket or similar structure surrounding the telephone, and the receiver is free for use in receiving incoming telephone calls.

The invention includes a face plate 13 which is installed in place of the face plate normally provided for the instrument 12. Alternatively, the face plate 13 may be installed as original equipment during the manufacture of the telephone instrument. The face plate 13 includes a matrix of apertures 14 extending therethrough and disposed to permit the push buttons of the telephone key pad to extend outwardly therethrough. Although the matrix of apertures 14 is depicted in the standard 12-button key pad format commonly used with present day telephones, it may be appreciated that the matrix of apertures 14 may be modified to receive any key pad configuration. The face plate 13 includes a notch 16 in one edge thereof, and a tab 17 extending from the opposite edge thereof. The features 16 and 17 are provided on a standard telephone face plate to engage a slot and spring detent mechanism which retains the face plate on the telephone.

The face plate 13 of the present invention includes a trio of slots 18 extending through the face plate adjacent to one side edge thereof. In the preferred embodiment the slots 18 are unequally spaced along the side edge, and are dissimilar in individual configuration for reasons which will be made apparent in the following description. The face plate 13 also includes a lock access hole 19 extending therethrough adjacent to the opposite side edge.

With reference to FIG. 3, the present invention also includes a cover member 21. The cover member 21 is generally planar and rectangular, and includes a lip 22 extending continuously about the edge of the cover and disposed substantially perpendicularly to the plane of the cover. The cover member 21 is dimensioned to be large enough to extend over the key pad portion of the telephone instrument 12. A trio of locking lugs 23 extend downwardly from one side edge of the cover member 21. The locking lugs 23 are spaced identically to the slots 18 in the face plate 13, and are adapted to be received therethrough. Each locking lug 23 includes a short dog-leg portion 24 extending perpendicularly from the distal end thereof.

The cover member 21 also includes a magnetically operated lock 26 secured in a recessed receptacle 27 integrally formed in the edge portion of the cover member opposite the locking lugs. The magnetically operated lock and key is disclosed in U.S. Pat. No. 4,022,038, issued May 10, 1977, to Albert J. Miller. The lock 26 includes a lock shaft 28 which extends from the bottom of the cover member 21 and is adapted to extend through the lock access hole 19 of the face plate 13, as shown in FIG. 4. Extending generally perpendicularly from the distal end of the lock shaft 28 is a latch member 29.

It may be appreciated that a standard telephone instrument 12 generally includes a housing 31 having an opening 32 extending upwardly from the upper front surface thereof. The housing 31 includes an internal flange 33 extending about the opening 32 and recessed slightly therein. The flange 33 is provided to support the face plate of the instrument.

In the present invention the face plate 13 is dimensioned to be received within the opening 32, and to be supported by the internal flange 33. The locking lugs 23 of the cover member 21 are dimensioned not only to be received through the slot 18 of the face plate, but also to engage the internal surface of the flange 33 to be retained thereby, as shown in FIG. 4. Likewise, the latch member 29 extending from the lock shaft 28 is adapted to engage the interior surface of the flange 33 to secure the cover member 21 to the housing 31. Thus the cover member 21, when installed and locked to the flange 33, is secured not to the face plate but rather to the housing of the telephone instrument. The cover member 21 is formed of a durable, impact-resistant material similar to the material used in fabricating the housing 31. As a result, prying or otherwise tampering with the cover member 21 is as likely to damage the housing 31 as to free the cover member 21.

As shown in FIGS. 1 and 4, the cover member 21 extends continuously above the key pad portion 36 of the telephone instrument to prevent access to the key pad portion 36. The cover member 21 may be removed from the telephone instrument by an authorized telephone user by means of a magnetic key 37 which is placed in a recess in the face of the magnetic lock 26. The key 37 having the proper magnetic code can be used to rotate the lock shaft 28 to effect release of the latch member 29 from its engagement with the internal flange 33. The cover member 21 then may be pivotted outwardly about the locking lugs 23, so that access may be had to the key pad portion 36. When the cover member 21 is rotated upwardly, it may also be removed by withdrawing the locking lugs from the slots 18 of the face plate. Of course, the cover member 21 may be reinstalled by the authorized user of the telephone by reversing the procedure described above.

I claim:

1. In conjunction with a telephone instrument having a faceplate opening and an internal flange therein; a lockable cover assembly comprising a faceplate received in said opening and supported by said flange, a matrix of holes in said faceplate through which the telephone push-button keypad extends, a plurality of slots extending through said faceplate and disposed adjacent to one edge thereof, a lock access hole extending through said faceplate and disposed adjacent to the edge opposite said one edge; a keypad cover member removably secured over said keypad to prevent access thereto, said cover member including a plurality of locking lugs extending from one edge thereof and adapted to extend through said slots to engage said internal flange in locking fashion, a lock device secured adjacent to the opposite edge of said cover member, said locking device including a shaft extending therefrom through said lock access hole, and latch means extending from said shaft to engage said internal flange and prevent removal of said cover member from said telephone instrument.

2. The cover assembly of claim 1, wherein said cover member includes a generally rectangular panel and a lip extending continuously thereabout, said lip extending toward said faceplate.

3. The cover assembly of claim 2, wherein said panel includes a generally cylindrical housing integrally formed therein to support said lock device.

4. The cover assembly of claim 2, wherein said locking lugs extend integrally from said lip of said cover member.

5. The cover assembly of claim 1, wherein each of said locking lugs includes a shank portion extending toward said faceplate, and a dogleg portion extending orthogonally from the distal end of said shank portion, said dogleg portions engaging an internal surface of said flange.

6. The cover assembly of claim 1, wherein said lock device comprises a magnetic lock having a key-receiving depression in the top thereof.

7. The cover assembly of claim 1, wherein said slots are unequally spaced along said one edge.

* * * * *